Aug. 22, 1961 W. J. METZGER 2,997,183
TRANSITIONAL COUPLING DEVICE
Filed March 14, 1960 2 Sheets-Sheet 1

INVENTOR.
BY WILLIAM J. METZGER
Henry Kozak
ATTORNEY

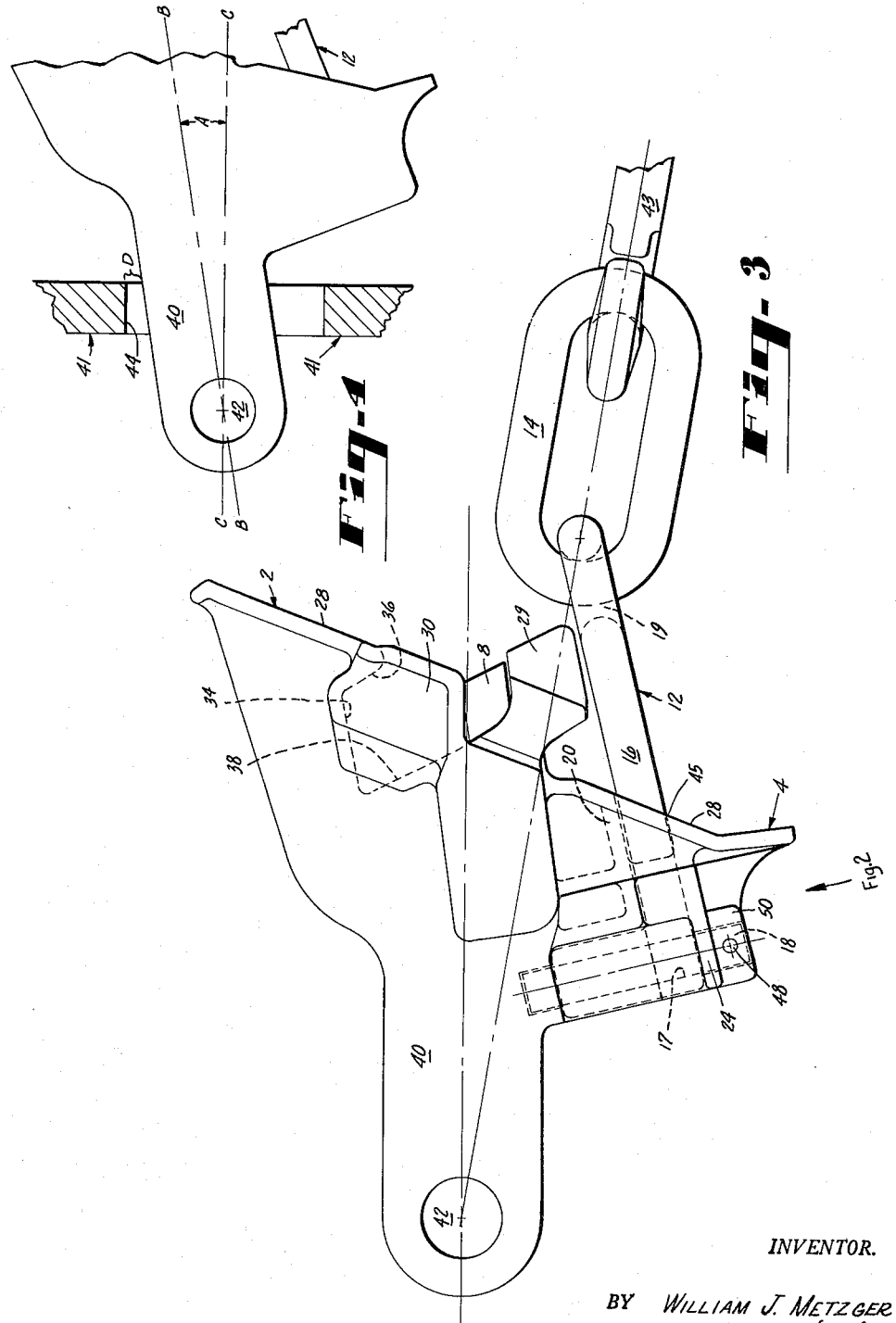

United States Patent Office 2,997,183
Patented Aug. 22, 1961

2,997,183
TRANSITIONAL COUPLING DEVICE
William J. Metzger, East Cleveland, Ohio, assignor to National Malleable and Steel Castings Company, Cleveland, Ohio, a corporation of Ohio
Filed Mar. 14, 1960, Ser. No. 14,618
4 Claims. (Cl. 213—112)

This invention relates to transitional railway coupling devices of the type adapted for attachment to railway vehicles currently employed by the railway industry.

In many countries throughout the world, the rolling stock employed by the railroads is equipped with manually actuated coupling devices. These manual devices are usually of the hook and clevis type and are not particularly adaptable for coupling with automatic couplers of the fixed-jaw type which are currently in use in these same areas. In recent years the fixed-jaw couplers have been modified in design by the addition of projections and pockets to the coupler face so as to create an interlocking coupler. An interlocking coupler is one that is so designed that when it is coupled with an opposing similar coupler vertical separation of the couplers is precluded.

This type of coupler is prevented from becoming disengaged from the opposing coupler when either coupler is pulled out of its pocket in the railway vehicle during a coupler pull-out. If the couplers were not of the interlocking type, the pulled-out coupler would probably drop to the track bed and possibly cause a derailment.

Transitional devices hitherto known in the art have been of a type that would function well with an automatic coupler of the non-interlocking type, but not with currently employed interlocking couplers. By necessity, interlocking automatic couplers have minimal clearance between the couplers when coupled together so as to preclude the two from becoming disengaged. As a result of this minimal clearance, any secondary coupling means must not interfere with the cooperating projections and pockets present on the interlocking coupler.

In most countries where the rolling stock is equipped with manually actuated coupling devices, it is usually not economically feasible or physically possible to suddenly switch from manual couplers to fully automatic interlocking couplers. What is necessary is a transitional device that is adapted to couple with the manually actuated coupler as well as adapted for automatic coupling.

It is therefore the primary object of this invention to provide a transitional coupling device adapted for use with automatic interlocking couplers.

A more specific object of this invention is to provide a transitional coupling device adapted for use with fixed-jaw automatic couplers of the interlocking type wherein the non-automatic coupling member is a component part of the automatic coupler and is pivotally mounted relative to the automatic coupler.

Other objects and advantages of this invention will be apparent from the following description and the accompanying drawings.

Referring to the drawings:

FIG. 3 is a plan view of the transitional device coupled with a draw-hook coupling device.

FIG. 4 is a plan view of the butt end of the transitional device.

Figure 1:
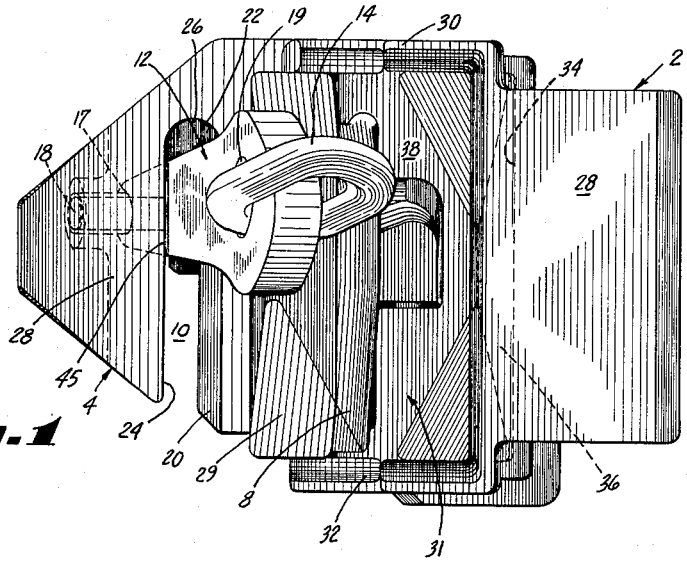
FIG. 1 is a perspective view of the front of the transitional coupling device.
Figure 2:
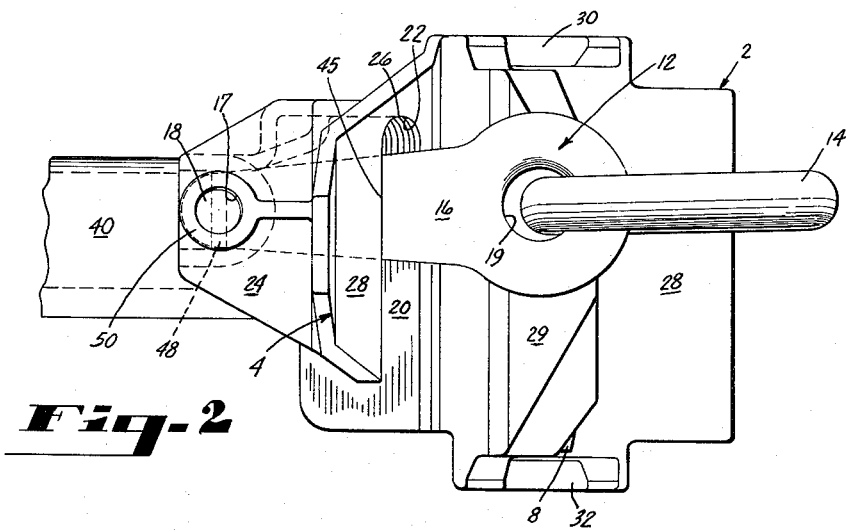
FIG. 2 is a side view of the transitional coupling device.

Referring to FIG. 1, there is illustrated an automatic coupler of the fixed-jaw type having aligning wings 2 and 4. Wing 2 is sometimes referred to in the prior art as a pulling jaw. Between the two wings in the front face of the coupler is a longitudinally movable lock 8 which is shown in its forward or locking position. Projecting forwardly from vertical recess 10 in aligning wing 4 is arm-and-link member 12. Recess 10 is disposed laterally outwardly along the coupler face from the lock so that member 12 will not interfere with the lock-engaging surfaces of the coupler when the latter is in coupled relationship with a similar coupler. Member 12 has connected thereto a forward link element 14 adapted for engagement with a draw-hook coupler. Member 12 is formed with a rearward arm portion 16, adapted for pivotal connection to the coupler. Arm 16 has a circular aperture 17 at its rearward end adapted to receive therein pin 18 for the pivotal mounting of member 12 within recess 10 and has a circular opening 19 at its forward end for receiving link 14. The recess 10, which is formed in wing 4, has an inner side wall 20, top wall 22, and outer wall 24 which serve to guide member 12.

It is the configuration of recess 10, defined by the opposing vertical side walls and top wall, that permits limited rotation of arm-and-link member 12 in a vertical plane about pin 18. Upward rotation of the arm-and-link member is restricted by forward edge 26 of top wall 22. There is no restriction on downward rotation of member 12. Recess 10 has no bottom wall or rear wall, thus permitting member 12 to be swung downwardly into stowed position rearward of front face 28 of the aligning wing. Intermediate buffing jaw 29 and aligning wing 2 is vertical recess 31 which is adapted to receive the buffing jaw of an opposing similar coupler. It is the requirement of being able to store the member when it is not in use that precludes its being mounted in vertical recess 31. Recess 31 is partly defined by forwardly extending upper and lower lugs 30 and 32, respectively. These lugs are adapted to receive therebetween the buffing jaw 29 of an opposing similar coupler when in coupled relationship to preclude the vertical displacement of the couplers relative to each other. Recess 10 in which arm-and-link member 12 is pivotally mounted is disposed laterally of lugs 30 and 32. The sides of recess 31 are defined by the lock 8 and wall 34. A pulling wall 36 is located forwardly of side wall 34 and faces generally rearwardly. Forward-facing rear wall 38 provides a buffing surface for engagement with the buffing jaw 29 of an opposing similar coupler.

Referring to FIG. 3, it should be noted that arm-and-link member 12 is angled horizontally inwardly toward the longitudinal axis of the automatic coupler. By so constructing the device, draft forces are aligned more closely along shank 40 of the automatic coupler. The length of arm 16 and the degree to which the arm is canted inwardly determines the extent to which the end of arm 16 is offset from the center line of shank 40. This is more clearly shown in FIG. 4 wherein the butt end of shank 40 of the automatic coupler is shown mounted in a conventional manner in a car equipped with a striker casting 41. Angle A is defined by the intersection of center line B of shank 40 and line C. Line C is formed by a straight line passing through connecting pin 42 and the end of arm portion 16. The size of angle A determines the degree of horizontal angling lost to the arm-and-link member illustrated. When the arm-and-link member is coupled to an adjoining car on a straight track, line C is centered in the striker casting as shown in FIG. 4. However, center line B of the shank is angled to the left toward the side of the striker casting. It is obvious from the drawing that arm-and-link member 12 is limited in hoizontal angling to the left by distance D which is the clearance remaining between wall 44 and the opposing wall of the shank, whereas full angling is available to the right. The embodiment of the invention illustrated is satisfactory for normal usage. Any increase in horizontal angling of the coupler to the left can be obtained by altering the length of arm 16 or the extent to which the arm is canted inwardly. By aligning the draft forces along the center line of shank 40, or as close thereto as possible, the device is able to utilize the full range of horizontal angling of the shank permitted by the car body center sill and striker casting. If hook 43, as drawn in FIG. 3, on the adjoining car were to assume a position that would require shank 40 to angle to the right horizontally beyond the range allowed by the customarily employed striker casting, arm 16 would be forced against edge 45 of opening 10 and possibly broken at this point. Hence, it is highly desirable to provide for an almost equal amount of horizontal angling in both directions to preclude unnecessary stresses from being imposed upon arm 16 during normal operations.

Arm portion 16 and link portion 14 are preferably cast or forged together, but any detachable link means may be attached to arm portion 16. It is also preferable that the clearance between arm 16 and side walls 20 and 24 be adequate to allow easy rotation of the arm-and-link member. However, unnecessary slack between the member and adjacent side walls will merely increase the opportunities for wear.

In assembling the device with the coupler, the member 12 is positioned in recess 10 with its circular aperture 17 in registry with suitable pin-receiving openings in walls 24 and 20. Pin 18 is then inserted through the openings and is locked in place by element 48 which extends through boss 50 on wall 24 and the pin.

It should be apparent that the arm-and-link member 12 may be mounted in a recess in either wing 2 or wing 4 with equal effectiveness. What has been disclosed, therefore, is a transitional coupling device capable of operating with fixed-jaw interlocking couplers as well as manually actuated coupling means. The device is characterized by a high degree of strength coupled with a simplicity of design.

The terms and expressions which have been employed are used as terms of description and not of limitation and there is no intention of excluding such equivalents of the invention described or of the portions thereof as fall within the purview of the claims.

What is claimed is:

1. A transitional coupling device comprising an interlocking automatic coupler of the fixed-jaw type and an arm-and-link member, said coupler having upper and lower lugs adapted to receive therebetween the buffing jaw of an opposing similar coupler, said coupler having a longitudinally movable lock and a recess in the front face of the coupler disposed laterally of said lugs, said recess having a top and two opposing side walls integrally formed with the front face of the coupler, the rearward portion of said member being adapted to be pivotally mounted intermediate said opposing side walls, said member mounted therein, said member and opposing side walls being canted inwardly toward the center line of said coupler, the forward portion of said member comprising pivotally mounted link means adapted for coupling engagement with an opposing coupler.

2. A transitional coupling device comprising an interlocking automatic coupler of the fixed-jaw type and an arm-and-link member, said coupler having a longitudinally movable lock and a recess in the front face of the coupler disposed laterally of said lock, said recess having a top and two opposing side walls integrally formed with the front face of the coupler, said member having a forward link portion and a rearward arm portion, said arm portion having a transverse opening therein for pivotal mounting in said recess, said member being pivotally mounted in said recess intermediate said opposing side walls, said arm portion and said side walls being canted inwardly toward the center line of said coupler, said forward link portion being adapted for coupling engagement with an opposing coupler.

3. A transitional coupling device comprising an interlocking automatic coupler of the fixed-jaw type and an arm-and-link member, said coupler having a longitudinally movable lock and aligning wings disposed laterally thereof in the front face of the coupler, a recess in one of said aligning wings having a top wall and two opposing side walls integrally formed with said wing, said member having a rearward arm portion and a forward link portion, said arm portion being adapted to be pivotally mounted intermediate said opposing side walls, said arm portion mounted therein, said arm portion and said side walls being canted inwardly toward the center line of said coupler, said link portion being adapted for coupling engagement with an opposing coupler.

4. A transitional coupling device comprising an interlocking automatic coupler of the fixed-jaw type and an arm-and-link member, said coupler having a longitudinally movable lock and aligning wings disposed laterally thereof in the front face of the coupler, a recess in one of said aligning wings having a top wall and two opposing side walls integrally formed with said aligning wing, said opposing side walls being canted inwardly toward the center line of said coupler, said member having a rearward arm portion and forward link portion pivotally joined, said arm portion being adapted for pivotal mounting intermediate said opposing side walls, said arm portion being pivotally mounted therebetween, said link portion being adapted for coupling engagement with an opposing coupler.

References Cited in the file of this patent

UNITED STATES PATENTS

| | | |
|---|---|---|
| 1,526,689 | Willison | Feb. 17, 1925 |
| 1,614,514 | Willison et al. | Jan. 18, 1927 |
| 1,614,518 | Willison | Jan. 18, 1927 |
| 1,829,819 | Blair | Nov. 3, 1931 |
| 1,876,816 | Wittmer | Sept. 3, 1932 |

FOREIGN PATENTS

| | | |
|---|---|---|
| 12,854 | Australia | Apr. 17, 1928 |
| 194,130 | Great Britain | Jan. 25, 1923 |
| 247,474 | Great Britain | Aug. 17, 1925 |
| 259,742 | Great Britain | Sept. 21, 1925 |